Figure 1:
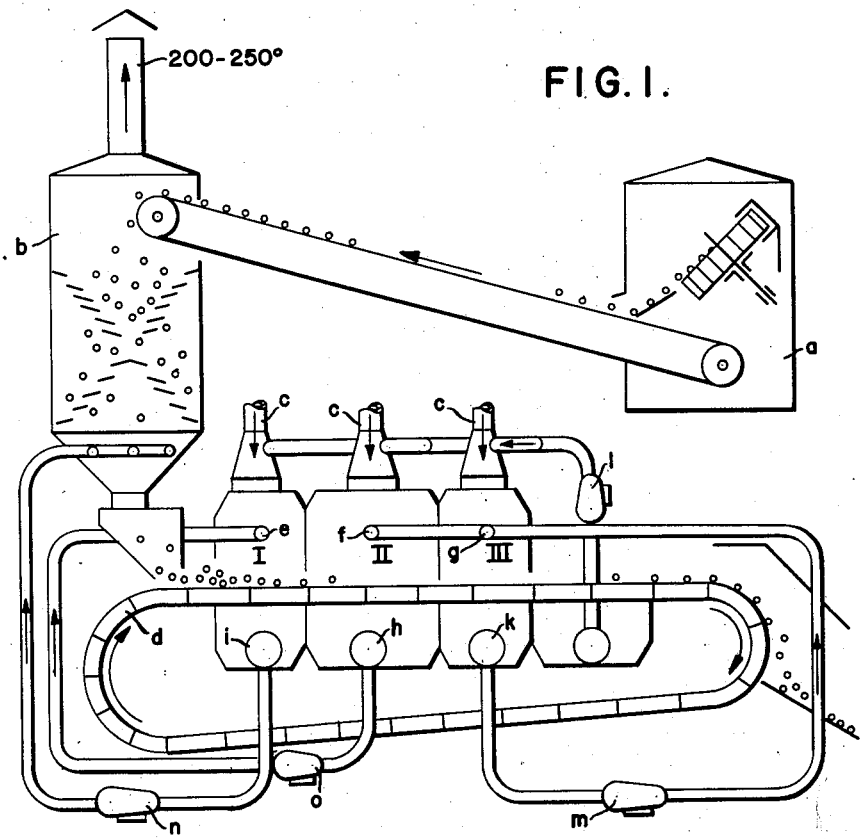

FIG. I.

INVENTOR
HANS ZIRNGIBL

April 14, 1964  H. ZIRNGIBL  3,129,063
APPARATUS FOR THE MANUFACTURE OF SULFUR DIOXIDE FROM SULFATES
Original Filed March 28, 1957  2 Sheets-Sheet 2

INVENTOR
HANS ZIRNGIBL

BY Burgess, Dinklage & Sprung
ATTORNEY

United States Patent Office

3,129,063
Patented Apr. 14, 1964

3,129,063
APPARATUS FOR THE MANUFACTURE OF SULFUR DIOXIDE FROM SULFATES
Hans Zirngibl, Leverkusen-Bayerwerk, Germany, assignor to Farbenfabriken Bayer Aktiengesellschaft, Leverkusen, Germany, a corporation of Germany
Original application Mar. 28, 1957, Ser. No. 649,032. Divided and this application Jan. 25, 1960, Ser. No. 4,287
Claims priority, application Germany Mar. 31, 1956
4 Claims. (Cl. 23—262)

The instant invention relates to a process for the production of sulfur dioxide from sulfates and to an apparatus for carrying out such process and is a division of application Serial No. 649,032, filed March 28, 1957, now abandoned.

The production of sulfur dioxide by decomposition of sulfates has already been repeatedly described. When decomposition by reduction is carried out on a technical scale, however, there is a danger of the sulfates not being completely reduced when part of the reducing agent is lost in the furnace atmosphere due to combustion. On the other hand, if excess reducing agent is supplied, sulfides can remain in the residue and these sulfides would be a nuisance in the further processing of the residue. In addition, undesirable reduction products are formed primarily sulfur vapours, which have to be burnt off before the sulfur dioxide can be used for the manufacture of sulfuric acid.

Processes and apparatus have already been proposed for the purpose of overcoming these difficulties. It is, for example, possible to use an internally heated rotary kiln into which air is injected at various points. At the same time, the interior of the rotary kiln is formed into different zones in which there are differing temperatures and also different compositions of the gas atmosphere and reaction material. Air is injected at 700–800° C. in an initial zone, whereby the sulfur vapours and other undesirable reduction products issuing from the adjacent, hotter zone are burnt without the reduction coke added to the sulfates being attacked at this temperature. In this zone, the reaction material is incompletely reduced at temperatures up to 1100° C. with less than the stoichiometric amount of solid or gaseous reducing agents. The fractions which so far have not been reduced are reacted in the hottest, final zone with gaseous reducing agents. Even this process still shows a certain number of defects, particularly when it is used on a large technical scale. It is certainly true that the required relative adjustment of the zones can be carried out in the gas atmosphere, but this adjustment cannot be carried out in the reaction material. Furthermore, the injection of air (the various zones are arranged by regulating the supply of air) into the hotter parts of the rotary kiln meets with technical difficulties. The necessary high temperatures lead to frequent breakdowns, which are caused by the formation of rings and other deposits and also damage to the masonry. This is particularly the case when mixtures are to be fired which have melting points and sintering points which are very close to one another.

It has now been found that the difficulties described above can be avoided, and satisfactory decomposition products can be obtained, if the reduction of sulfates is carried out in three stages, the atmosphere in the first stage, i.e., in the coldest zone, being kept slightly oxidizing the atmosphere in the middle zone being kept inert, when reduction carbon is used and employing in the third zone and final stage a reducing action. It is, however, also possible to operate with a reducing gas atmosphere in both of the last zones. The decomposition is carried out on a conveying belt which is equipped with a hood-heating system which permits the supply of heat in the three zones. Those exhaust gases from the final, hottest zone and from the adjacent, slightly less hot middle zone which are not required for temperature control, and consequently are not recycled, are introduced into a colder zone, if desired with the addition of air and perhaps with supplementary heating. The reduction takes place mainly in the middle zone, which contains less than the stoichiometric amount of reducing agent. The reaction material is preferably heated in the initial zone to 500–800° C., in the middle zone to 900–1200° C. and in the final zone up to sintering temperature of the material used, i.e., about 1100° C. to about 1400° C.

The process is indicated diagrammatically in FIG. 1 of the accompanying drawings. The reaction material is first of all granulated in a granulating device $a$ and initially dried in a hopper $b$. It then passes on to a conveyor belt $d$, which conveys the material successively into the separate heating zones of the hood-heating system. In a heating arrangement $c$, fuel, for example oil, is supplied in the direction of the vertical arrows, and air for combustion is supplied through a fan $l$ in the direction of the horizontal arrow. In the initial zone I, the reaction material is preheated to 500–800° C. The atmosphere is maintained so as to be slightly oxidizing by the addition of air, but carbon is not affected at the temperatures prevailing this zone. Consequently, all undesirable reduction products, such as for example sulfur vapour, which are contained in the gases leaving the middle zone II at $h$ and entering the initial zone at $e$ by way of a fan $o$, are completely burnt to form sulfur dioxide. If desired, the exhaust gases can be additionally heated before they enter the initial zone. The production gas discharging at $i$ through a fan $n$ can therefore be used for the manufacture of sulfuric acid by the catalytic process, after dust has been extracted in the usual manner from the gas, without further purification.

The reduction takes place mainly in the middle zone at a temperature of 900–1200° C. The amount of reducing agent in this zone is less than the stoichiometric amount. If the reduction taking place in this zone is produced by solid reduction agents, such as for example carbon, the atmosphere is kept inert. It is however also possible to work with gaseous reducing agents.

The final reduction takes place in the last, hottest zone III, in which the material is heated up to sintering temperature. That proportion of the exhaust gases which is required for temperature control and which discharges at $k$ through a fan $m$ is returned into zone II at $g$. The remainder is fed, after supplementary heating, at $f$ into the middle zone.

Figure 2:
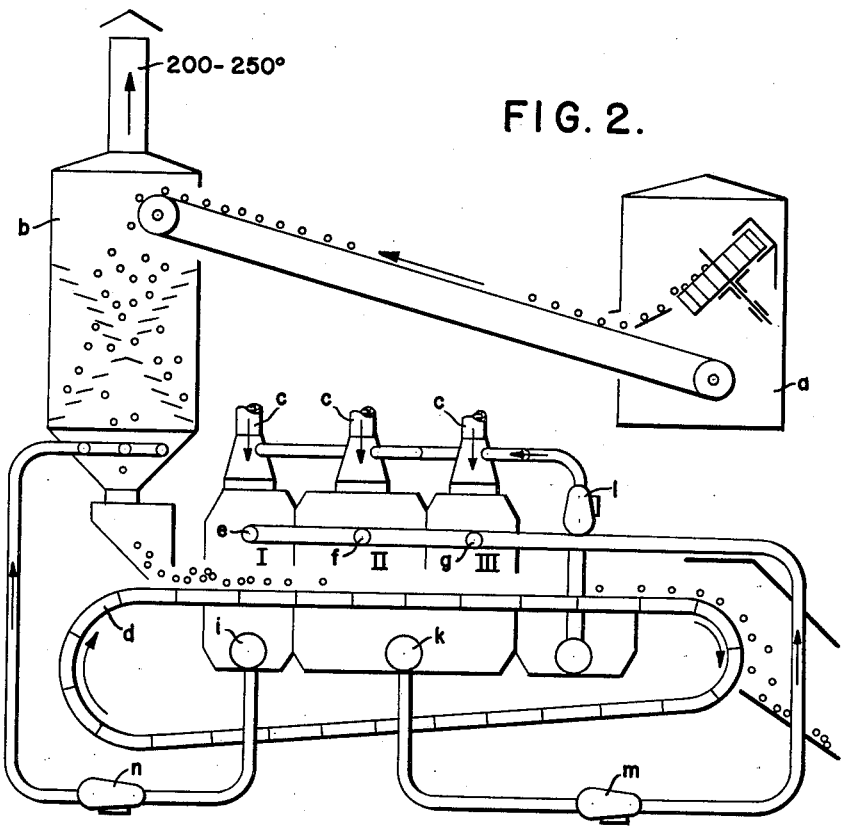

FIG. 2 shows a modification of the above-described process in which the exhaust gases are removed jointly from the middle zone and final zone. That amount thereof which is required for temperature control is returned into these zones while the remainder is supplied to the initial zone, so that also in this case all the production gas must pass through the oxidizing initial zone, where the undesirable reduction products are eliminated, before it is extracted.

The necessary energy for heating and decomposition purposes can be produced from coal dust or by gas firing or oil firing.

It is particularly advantageous for all or part of the energy to be generated by the combustion of elementary sulfur. With the process used herein, a complete combustion of the sulfur is assured. At the same time, the concentration of sulfur dioxide in the production gases is increased. This is particularly favorable for the further processing of the final gas to form sulfuric acid by the catalytic process since the dimensions of the apparatus can be kept smaller than when dilute gases are used, owing to the higher sulfur dioxide content.

Occasionally, it is advantageous to use a mixed firing system, wherein other combustible substances containing carbon are added as well the reduction carbon to the reaction material in the middle zones, these substances yielding some of the energy which is required.

An essential advantage of the process is to be seen in the fact that the reaction conditions in the separate zones can be exactly adjusted. Any desired temperature can be produced without any difficulty in each zone with a latitude of about ±10° C. In addition, the gas composition and gas pressure, as well as the residence times of the solid phase, can be modified. Further advantages, consist in the good distribution of the gas in the material under treatment, in the high speed of heat exchange and in the good utilization of the heat with a low heat drop. By using the procedure which is proposed, it is ensured that the production gas is free from undesirable impurities. Moreover, the dust content of the production gases is considerably lower than when the rotary kiln process is used. The process according to the invention enables defects to be immediately detected, examples of these defects being an incorrect rate of introduction of the initial powder, incorrectly measured quantities of reducing agents or incorrect adjustment of the gas atmosphere. Owing to the use of the endless conveyor belt, the operation is not stopped by melting or sintering of the reaction material. Since the process permits accurate adjustment of the temperature, it is also possible to burn mixtures which have sintering and melting points closely adjacent to one another.

In the decomposition of calcium sulfate with the simultaneous formation of cement clinker, it is for example not necessary to make the final composition of the clinker dependent on the manner in which the furnace is operated, as was formerly the case. Using the conveyor belt equipped with a hood heating system, it is possible to obtain complete desulfurization and simultaneously produce special cements, such as for example aluminate and Ferrari cements and clinkers containing dicalcium silicate and alumina which may be leached on alumina.

In conjunction with the simultaneous production of sulfuric acid and Portland cements, it has been contended that special cements such as those referred to above can be obtained by the desulfurization as carried out in rotary kilns. In practice, however, this has not proved to be the case, the same being prevented by damage to the brickwork and excessive ring formation.

By using the process of the invention, it is possible to decompose all technically important sulfates without any interference, as, for example ferrous sulfate, magnesium sulfate, calcium sulfate and mixtures of calcium sulfate with materials containing clay, in which case cements of clinkers which can be leached on alumina are simultaneously obtained, as well as aluminum sulfate, mixtures of aluminum sulfate and sodium sulfate, sodium sulfate bauxite and other sulfate mixtures.

*Example 1*

78 parts of anhydride containing 91% of $CaSO_4$ are mixed with 15.2 parts of a clay slate having the following composition:

| | Percent |
|---|---|
| $SiO$ | 60.0 |
| $Al_2O_3TiO_2$ | 20.0 |
| $Fe_2O_3$ | 6.5 |
| Alkalis | 3.5 |
| Volatile compounds, consisting of water and organic constituents | 10.0 | and 5.5 parts of coke (81% C), ground to the fineness of cement and moulded in the usual manner with about 10–12% of water in a granulating plate. For the purpose of protecting the grate bars, the conveyor belt is initially covered to a height of 3–5 cm. with finely burnt clinker and the granules are placed thereon to a height of 50 cm. For protection against heat losses and as a sealing means with respect to the heating hoods arranged above the conveyor belt, fine-grain or dust-like clinker is placed at both sides when the band is charged with the granules. The material travels beneath the first hood, where it is initially heated by the exhaust gases from the second zone to about 600° C. In order to obtain the required oxygen content of 1–2%, the necessary amount of air is forced into this hood. Thereafter, the material is heated under the second hood by gases from the final zone and by additional heating with oil flames to 1000–1100° C. in an inert gas atmosphere, and finally under the last hood by oil flames in a slightly reducing atmosphere to 1400° C. The gas atmosphere beneath the hoods is adjusted by regulating the amounts of oil and air supplied for combustion. The gas for combustion is previously forced through the hot clinker on the last section of the belt and in this way is heated while simultaneously cooling the clinker.

The resulting clinker is sintered and practically free from sulfur. It is mixed in the usual manner with gypsum and crushed to form cement. The hot gases leaving the kiln, which have a temperature of about 150–200° C. and contain sulfur dioxide, are freed from dust, mixed in known manner with air and treated in the presence of catalysts to form sulfuric acid. The capacity of the sintering plant is in the region of 7.5 tons per day per square meter of available sintering area.

*Example 2*

Ferrous sulfate monohydrate is granulated in admixture with coke while hot and with a concentrated ferrous sulfate solution, and decomposed on a conveyor belt with hood heating, substantially as described in Example 1. The exhaust gases from the final zone are however extracted jointly with the exhaust gases from the middle zones, as is shown in FIG. 2. The molar ratio between $SO_4$:C is 2:1. The temperature is kept at 500° C. in the pre-heating zone, 900° C. in the second zone and 1100° C. in the last zone.

The capacity is about 6 tons per day per square meter of available sintering area with a velocity of the conveyor belt of 15 cm./min. and a layer thickness of 20 cm.

*Example 3*

A mixture of aluminium sulfate/sodium sulfate/coke in the molar ratio of aluminium sulfate:sodium sulfate=1:1 and $SO_4$:C=1.6:1 is granulated and burnt as described in Example 1. The temperature is adjusted to 500° C. in the pre-heating zone, 1000–1100° C. in the middle zone and 1200° C. in the final zone. Sodium aluminate is formed which contains less than 0.1% of sulfur.

I claim:

1. A device for manufacturing sulfur dioxide by the reduction of sulfates, comprising an endless conveying belt, three successively arranged heating hoods positioned to partially surround the conveying belt and to substantially completely surround a portion of belt travel, each of said heating hoods being equipped with a burner in the upper part thereof above the belt for directing heat downwardly toward said belt, a gas inlet for produced reduction gas in the upper part of each of said hoods above the belt between it and said burner, a gas outlet for produced reduction gas in the lower part of the heating hood below the belt, means for dedusting and purifying $SO_2$ containing produced gas, gas conduit means connecting said gas outlet of the first heating hood (in the direction of the movement of the conveying belt) to said dedusting and purifying means, the gas outlets of the second and third heating hoods communicating with the produced reduction gas inlets of the preceding heating hood, means for introducing $SO_4$, containing materials to be reduced on to said conveying belt in front of the first of said hoods for passage on said belt through said hoods, and means for withdrawing the spent $SO_4$ material from the conveying belt behind the last of said three hoods.

2. A device for manufacturing sulfur dioxide by the reduction of sulfates, comprising an endless conveying belt, three successively arranged heating hoods positioned to partially surround the conveying belt and to substantially completely surround a portion of belt travel, each of said heating hoods being equipped with a burner in the upper part thereof above the belt for directing heat downwardly toward said belt, a gas inlet for produced reduction gas in the upper part of each of said hoods above the belt between it and said burner, a gas outlet for produced reduction gas in the lower part of the heating hood below the belt, means for drying $SO_2$ containing produced gas containing moist sulfate granules, means for dedusting and purifying $SO_2$ containing produced gas, gas conduit means connecting said gas outlet of the first heating hood (in the direction of the movement of the conveying belt) to said means for drying and dedusting and purifying, the gas outlets of the second and third heating hoods communicating with the produced reduction gas inlets of the preceding heating hood, means for introducing $SO_4$ containing material to be reduced on to said conveying belt in front of the first of said hoods for passage on said belt through said hoods, and means for withdrawing the spent $SO_4$ material from the conveying belt behind the last of said three hoods.

3. A device for manufacturing sulfur dioxide by the reduction of sulfates, comprising an endless conveying belt, three successively arranged heating hoods positioned to partially surround the conveying belt and to substantially completely surround a portion of belt travel, each of said heating hoods being equipped with a burner in the upper part thereof above the belt for directing heat downwardly toward said belt, a gas inlet for produced reduction gas in the upper part of each of said hoods above the belt between it and said burner, a gas outlet for produced reduction gas in the lower part of the heating hood below the belt, means for dedusting and purifying $SO_2$ containing produced gas, gas conduit means connecting said gas outlet of the first heating hood (in the direction of the movement of the conveying belt) to said dedusting and purifying means, the gas outlets of the second and third heating hoods communicating with the produced reduction gas inlets of the said heating hoods, means for introducing $SO_4$ containing material to be reduced on to said conveying belt in front of the first of said hoods for passage on said belt through said hoods, means for withdrawing the spent $SO_4$ material from the conveying belt behind the last of said three hoods, and means connecting said withdrawal means with air supply means whereby the heat of said spent material can be utilized to heat said air.

4. A device for manufacturing sulfur dioxide by the reduction of sulfates, comprising an endless conveying belt, three successively arranged heating hoods positioned to partially surround the conveying belt and to substantially completely surround a portion of belt travel, each of said heating hoods being equipped with a burner in the upper part thereof above the belt for directing heat downwardly toward said belt, a gas inlet for produced reduction gas in the upper part of each of said hoods above the belt between it and said burner, a gas outlet for produced reduction gas in the lower part of the heating hood below the belt, means for drying $SO_2$ containing produced gas containing moist sulfate granules, means for dedusting and purifying $SO_2$ containing produced gas, gas conduit means connecting said gas outlet of the first heating hood (in the direction of the movement of the conveying belt) to said means for drying and dedusting and purifying, the gas outlets of the second and third heating hoods communicating with the produced reduction gas inlets of the preceding heating hood, means for introducing $SO_4$ containing material to be reduced on to said conveying belt in front of the first of said hoods for passage on said belt through said hoods, means for withdrawing the spent $SO_4$ material from the conveying belt behind the last of said three hoods, and means connecting said withdrawal means with air supply means whereby the heat of said spent material can be utilized to heat said air.

References Cited in the file of this patent
UNITED STATES PATENTS

| 1,926,032 | Bunce et al. | Sept. 12, 1933 |
| 2,252,279 | Zirngibl | Aug. 12, 1941 |
| 2,750,274 | Lellep | June 12, 1956 |

UNITED STATES PATENT OFFICE
CERTIFICATE OF CORRECTION

Patent No. 3,129,063                                  April 14, 1964

Hans Zirngibl

It is hereby certified that error appears in the above numbered patent requiring correction and that the said Letters Patent should read as corrected below.

Column 2, line 49, for "zone II" read -- zone III --; column 3, line 5, after "well" insert -- as --; column 4, line 74, after "$SO_4$" strike out the comma; line 75, for "materials" read -- material --.

Signed and sealed this 11th day of August 1964.

(SEAL)
Attest:

ERNEST W. SWIDER                                      EDWARD J. BRENNER
Attesting Officer                                          Commissioner of Patents